(12) United States Patent
Fulton et al.

(10) Patent No.: US 12,088,149 B2
(45) Date of Patent: Sep. 10, 2024

(54) COOLING SYSTEM FOR AN ELECTRIC MACHINE

(71) Applicant: BorgWarner Inc., Auburn Hills, MI (US)

(72) Inventors: Dave Fulton, Anderson, IN (US); Matt Conner, Mount Carmel, IL (US); Joshua Lahrman, New Palestine, IN (US)

(73) Assignee: BORGWARNER INC., Auburn Hills, MI (US)

( * ) Notice: Subject to any disclaimer, the term of this patent is extended or adjusted under 35 U.S.C. 154(b) by 418 days.

(21) Appl. No.: 17/540,328

(22) Filed: Dec. 2, 2021

(65) Prior Publication Data

US 2023/0179049 A1 Jun. 8, 2023

(51) Int. Cl.
*H02K 1/32* (2006.01)
*H02K 3/28* (2006.01)

(52) U.S. Cl.
CPC ............... *H02K 1/32* (2013.01); *H02K 3/28* (2013.01)

(58) Field of Classification Search
CPC .... H02K 1/32; H02K 3/28; H02K 9/227; H02K 3/521; H02K 9/197; H02K 9/19; H02K 3/24
USPC ........................................................ 310/52
See application file for complete search history.

(56) References Cited

U.S. PATENT DOCUMENTS

| | | |
|---|---|---|
| 3,299,738 A | 1/1967 | Sand |
| 4,330,726 A | 5/1982 | Albright |
| 4,912,350 A | 3/1990 | Parshall et al. |
| 5,331,238 A | 7/1994 | Johnsen |
| 5,666,016 A * | 9/1997 | Cooper ............... H02K 3/24 310/59 |
| 5,845,756 A | 12/1998 | Dairokuno et al. |
| 6,201,365 B1 | 3/2001 | Hara et al. |
| 6,323,613 B1 | 11/2001 | Hara et al. |

(Continued)

FOREIGN PATENT DOCUMENTS

| | | |
|---|---|---|
| CN | 101232211 A | 7/2008 |
| CN | 101790831 A | 7/2010 |

(Continued)

OTHER PUBLICATIONS

Chinese Application No. 202080009172.9 filed Jul. 14, 2021; Chinese Office Action dated Oct. 21, 2023; 10 pages.

(Continued)

*Primary Examiner* — Ahmed Elnakib
(74) *Attorney, Agent, or Firm* — CANTOR COLBURN LLP

(57) ABSTRACT

A rotor for an electric machine including a shaft having a first end, a second end, an outer surface and an inner surface that defines a passage extending between the first end and the second end. A plurality of rotor laminations is mounted to the outer surface of the shaft. A plurality of windings extends about the plurality of rotor laminations. The plurality of windings includes a first end turn arranged proximate the first end and a second end turn arranged proximate the second end turn. An end turn support is arranged at one of the first and second end turns. The end turn support includes a cooling circuit fluidically connected to the passage. The cooling circuit includes an outlet that directs coolant onto the one of the first and second end turns.

27 Claims, 7 Drawing Sheets

(56) References Cited

U.S. PATENT DOCUMENTS

| | | | |
|---|---|---|---|
| 7,102,260 B2 | 9/2006 | Takenaka et al. | |
| 7,633,194 B2 | 12/2009 | Dawsey | |
| 7,749,122 B2 | 7/2010 | Yoneyama | |
| 7,946,118 B2 | 5/2011 | Hippen et al. | |
| 8,201,316 B2 | 6/2012 | Rippel et al. | |
| 8,269,384 B2 | 9/2012 | Bradfield | |
| 8,269,393 B2 * | 9/2012 | Patel | H02K 3/527 310/194 |
| 8,378,550 B2 | 2/2013 | Bradfield | |
| 8,395,287 B2 | 3/2013 | Bradfield | |
| 8,427,018 B2 | 4/2013 | Dutau et al. | |
| 8,629,585 B2 | 1/2014 | Bradfield | |
| 8,866,353 B2 | 10/2014 | Miyama et al. | |
| 8,872,399 B2 | 10/2014 | Chamberlin et al. | |
| 9,306,433 B2 | 4/2016 | Sten et al. | |
| 9,903,242 B2 | 2/2018 | Long et al. | |
| 9,960,654 B2 | 5/2018 | Bradfield | |
| 10,333,365 B2 * | 6/2019 | Patel | H02K 9/19 |
| 10,389,211 B2 | 8/2019 | Bradfield | |
| 10,621,541 B2 | 4/2020 | Andres et al. | |
| 11,025,114 B2 * | 6/2021 | Sridharan | H02K 3/51 |
| 2003/0048015 A1 * | 3/2003 | Tornquist | H02K 3/527 310/103 |
| 2003/0193256 A1 * | 10/2003 | Liebermann | H02K 3/24 310/194 |
| 2004/0045749 A1 | 3/2004 | Jaura et al. | |
| 2006/0284511 A1 | 12/2006 | Evon et al. | |
| 2007/0013241 A1 | 1/2007 | Schiferl et al. | |
| 2008/0100159 A1 | 5/2008 | Dawsey et al. | |
| 2011/0298316 A1 | 12/2011 | Bradfield | |
| 2011/0298317 A1 | 12/2011 | Bradfield | |
| 2011/0298318 A1 | 12/2011 | Bradfield | |
| 2011/0304227 A1 | 12/2011 | Bradfield | |
| 2012/0074799 A1 | 3/2012 | Bradfield | |
| 2012/0080117 A1 | 4/2012 | Bradfield | |
| 2012/0080964 A1 | 4/2012 | Bradfield | |
| 2012/0091834 A1 | 4/2012 | Bradfield | |
| 2013/0049495 A1 | 2/2013 | Matsuo | |
| 2013/0076166 A1 | 3/2013 | Chamberlin et al. | |
| 2013/0119793 A1 | 5/2013 | Hofkirchner et al. | |
| 2013/0214624 A1 | 8/2013 | Kubes et al. | |
| 2014/0070640 A1 | 3/2014 | Tolpadi et al. | |
| 2015/0076935 A1 | 3/2015 | Bulatow et al. | |
| 2016/0149448 A1 | 5/2016 | Koenig et al. | |
| 2016/0149450 A1 * | 5/2016 | Horii | H02K 1/32 310/54 |
| 2016/0211713 A1 * | 7/2016 | Patel | H02K 3/30 |
| 2016/0241093 A1 * | 8/2016 | Patel | H02K 1/20 |
| 2016/0372983 A1 | 12/2016 | Okochi | |
| 2017/0144532 A1 | 5/2017 | Tokozakura et al. | |
| 2019/0291570 A1 | 9/2019 | Tang et al. | |
| 2020/0227977 A1 | 7/2020 | Bradfield | |
| 2020/0389070 A1 | 12/2020 | Bradfield | |
| 2021/0367461 A1 | 11/2021 | Barti et al. | |
| 2022/0239170 A1 | 7/2022 | Bradfield | |
| 2023/0179037 A1 | 6/2023 | Bradfield | |
| 2023/0179049 A1 * | 6/2023 | Fulton | H02K 1/32 310/52 |
| 2023/0246499 A1 * | 8/2023 | Sridharan | H02K 9/19 310/61 |
| 2024/0006961 A1 | 1/2024 | Bradfield | |

FOREIGN PATENT DOCUMENTS

| | | |
|---|---|---|
| CN | 102893496 A | 1/2013 |
| CN | 102934328 A | 2/2013 |
| CN | 103155376 A | 6/2013 |
| CN | 103326483 A | 9/2013 |
| CN | 105048662 A | 11/2015 |
| CN | 106716794 A | 5/2017 |
| CN | 207150273 U | 3/2018 |
| CN | 111769674 A | 10/2020 |
| DE | 102015215762 A1 | 2/2017 |
| DE | 102017213960 * | 2/2019 |
| JP | 2006033916 A | 2/2006 |

OTHER PUBLICATIONS

International Search Report and Written Opinion for International Application No. PCT/US2020/013073; International Filing Date Jan. 10, 2020; Report Mail Date May 8, 2020 (pp. 1-8).

* cited by examiner

COOLING SYSTEM FOR AN ELECTRIC MACHINE

BACKGROUND OF THE INVENTION

Exemplary embodiments pertain to the art of electric machines and, more particularly, to a cooling system for an electric machine.

Electric machines typically include a rotor that revolves within a stator. During operation, electrical energy flow through the electric machine increases internal component operational temperatures. For example, electrical flow through rotor windings and stator windings increases an overall operational temperature of the rotor and stator respectively. Heat can reduce operational performance and an overall operational life of an electric machine. In order to reduce heat buildup, coolant is typically passed through the electric motor. Coolant may take the form of a fluid such as air, water, or oil or any other fluid.

BRIEF DESCRIPTION OF THE INVENTION

Disclosed, in accordance with a non-limiting example, is a rotor for an electric machine including a shaft having a first end, a second end, an outer surface and an inner surface that defines a passage extending between the first end and the second end. A plurality of rotor laminations is mounted to the outer surface of the shaft. A plurality of windings extends about the plurality of rotor laminations. The plurality of windings includes a first end turn arranged proximate the first end and a second end turn arranged proximate the second end turn. An end turn support is arranged at one of the first and second end turns. The end turn support includes a cooling circuit fluidically connected to the passage. The cooling circuit includes an outlet that directs coolant onto the one of the first and second end turns.

Also disclosed, in accordance with a non-limiting example, is an electric machine including a housing, a stator fixedly supported in the housing and a rotor mounted radially inwardly of the stator, the rotor includes a shaft having a first end, a second end, an outer surface and an inner surface that defines a passage extending between the first end and the second end. A plurality of rotor laminations is mounted to the outer surface of the shaft. A plurality of windings extends about the plurality of rotor laminations. The plurality of windings includes a first end turn arranged proximate the first end and a second end turn arranged proximate the second end turn. An end turn support is arranged at one of the first and second end turns. The end turn support includes a cooling circuit fluidically connected to the passage. The cooling circuit includes an outlet that directs coolant onto the one of the first and second end turns.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
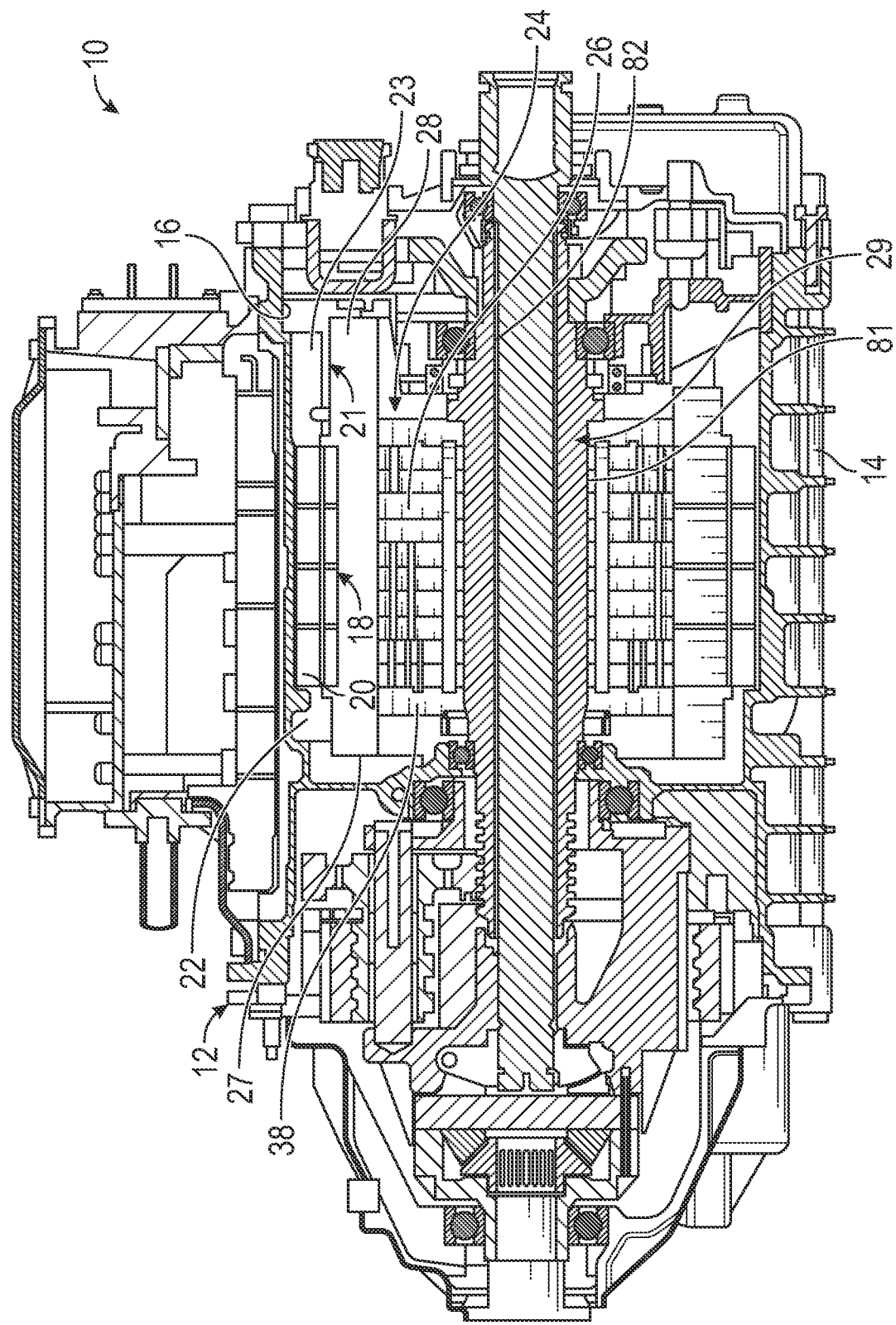
FIG. 1 depicts an electric machine including a rotor having a cooling system, in accordance with a non-limiting example.

An electric machine, formed in accordance with a non-limiting example, is indicated generally at 10 in FIG. 1. Electric machine 10 includes a housing 12 having an outer surface 14 and an inner surface 16. A stator 18 including a plurality of stator laminations 20 is mounted to inner surface 16. Stator 18 includes a stator winding 21 having a first stator end turn 22 and a second stator end turn 23. A rotor 24 is rotatably supported within stator 18.

Figure 2:
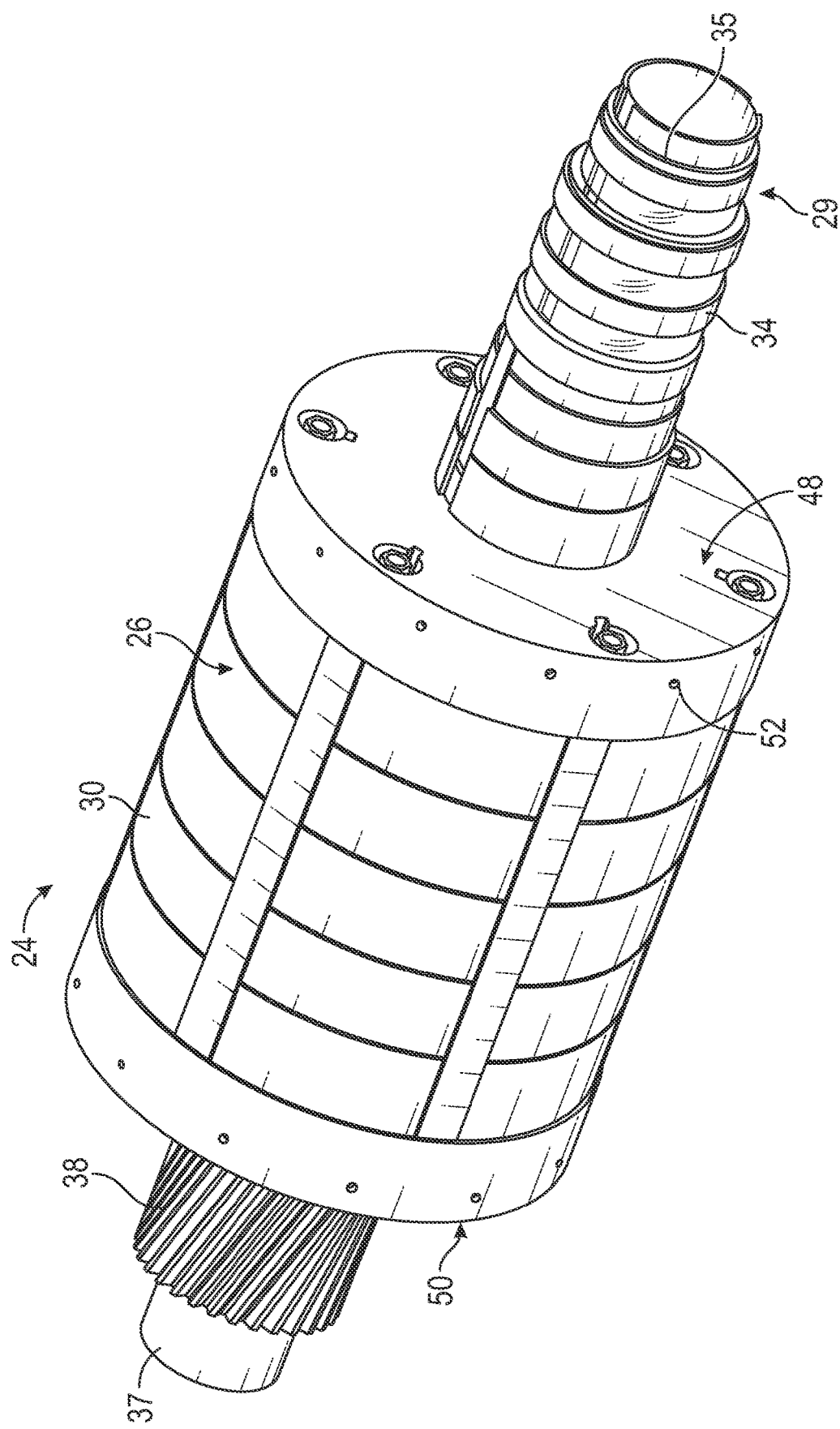
FIG. 2 depicts the rotor of FIG. 1, in accordance with a non-limiting example.
Figure 6:
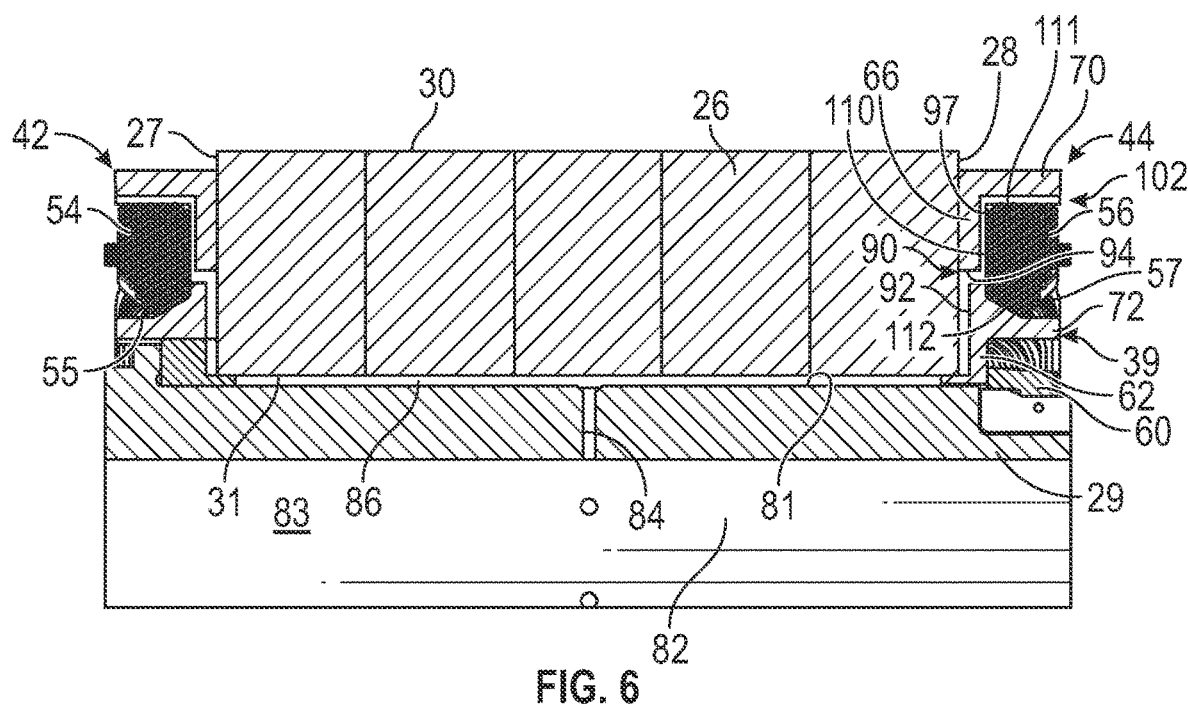
FIG. 6 depicts a cross-section of the rotor of FIG. 5 taken along the lines 5-5, in accordance with a non-limiting example.

Rotor 24 includes rotor laminations 26 having a first end 27 and an opposing second end 28 and are mounted to a shaft 29. Rotor laminations 26 include an annular outer surface 30 and an annular inner surface 31 (FIG. 6). Shaft 29 may support electrical components such as, for example, slip rings 34 at a first end 35 and a gear 38 at a second opposing end 37. Rotor 24 includes rotor windings 36 (FIG. 3) supported by rotor laminations 26. Rotor 24 includes a cooling system 39 (FIG. 4) supported by shaft 29 and rotor laminations 26 as will be detailed herein. Cooling system 39 includes a first series of end turn supports 42 arranged at first end 27 of rotor laminations 26 and a second series of end turn supports 44 arranged at an opposing end 28 of rotor laminations 26. In a non-limiting example depicted in FIG. 2, a first end cover 48 is provided over first end 27 of rotor laminations 26 and a second end cover 50 is provided over second end 28 of rotor laminations 26. End cover 50 may be formed from a non-magnetic material such as aluminum or stainless steel. End cover 50 may also double as a balance ring wherein material is selectively removed to improve the balance of the rotor. Each end cover 48, 50 includes a plurality of openings such as indicated at 52 on first end cover 48, that fling coolant onto stator 18.

Figure 3:
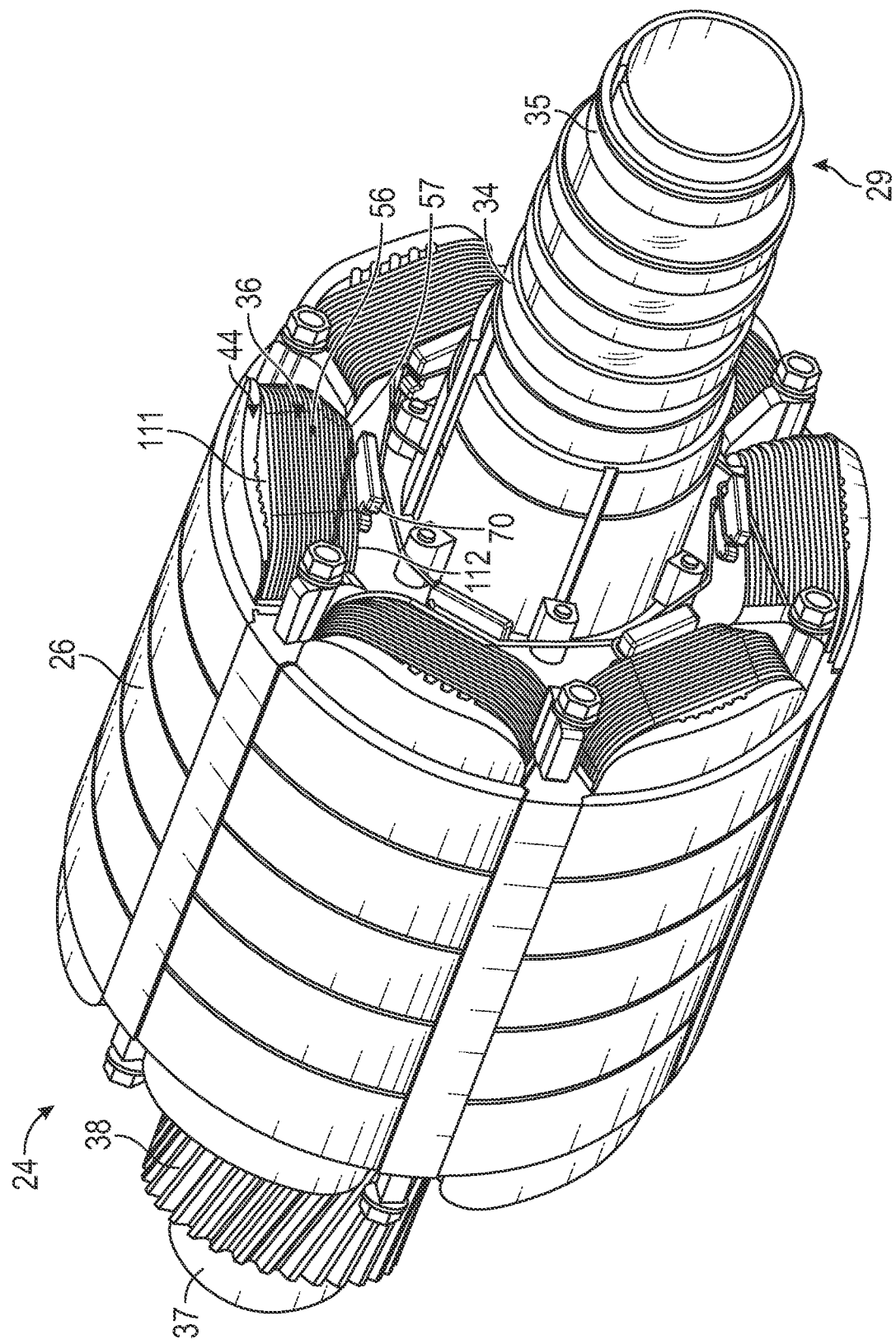
FIG. 3 depicts the rotor of FIG. 2 with first and second end covers being removed, in accordance with a non-limiting example.
Figure 4:
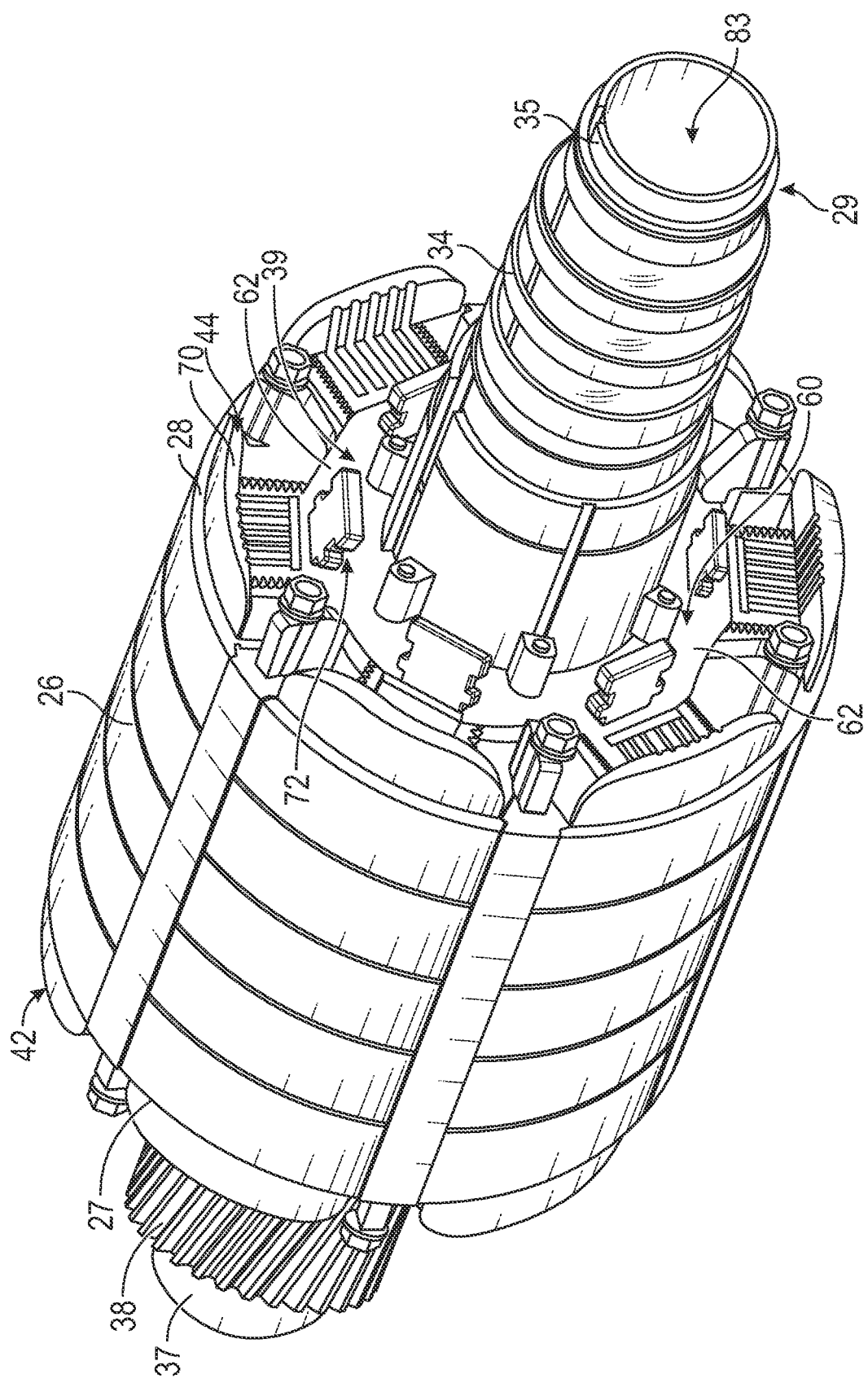
FIG. 4 depicts the rotor of FIG. 3 with a portion of a first end turn being removed, in accordance with a non-limiting example.
Figure 5:
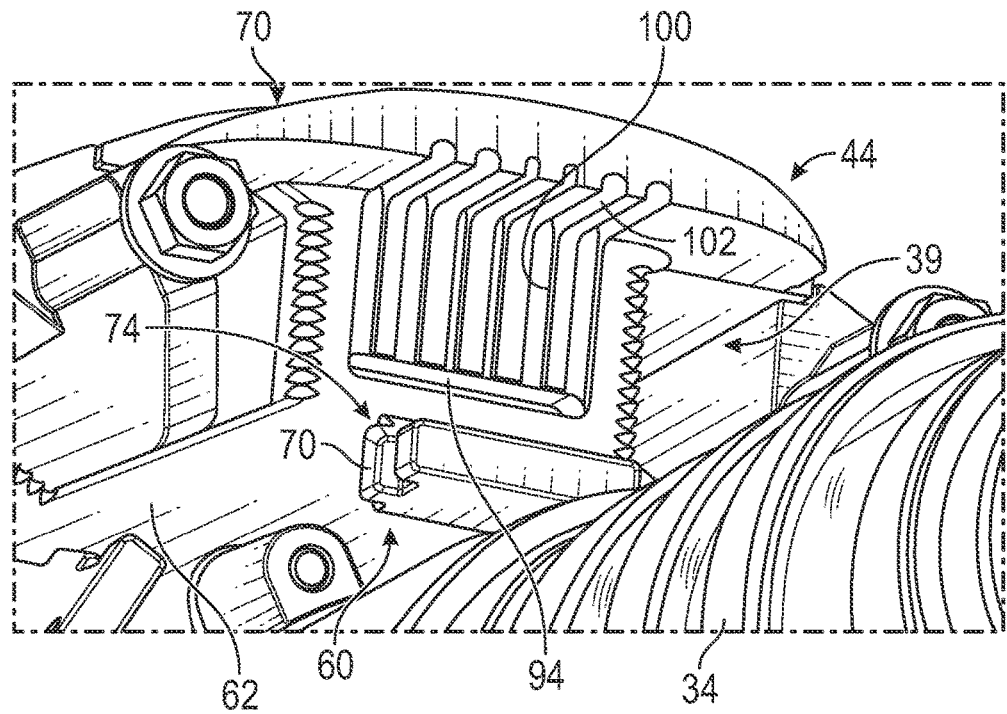
FIG. 5 depicts the rotor of FIG. 4 including an end turn support having a portion of the cooling system, in accordance with a non-limiting example.

In a non-limiting example shown in FIG. 3, rotor windings 36 includes a first plurality of end turns 54 having an interior surface 55 (FIG. 5) arranged at first end 27 and a second plurality of end turns 56 having an interior surface 57 arranged at second end 28. End turns 54 and 56 are supported at rotor laminations 26 by corresponding ones of first and second end turn supports 42 and 44 to promote cooling as will be detailed herein. As shown in FIG. 4, second end turn supports 44 includes an annular body 60 that extends around shaft 29 and is connected to rotor laminations 26. Annular body 60 includes a plurality of end turn support portions 62 that form a web (not separately labeled) that connect the first end turn supports 42.

Reference will now follow to FIGS. 5-8 with continued reference to FIG. 4 in describing cooling system 39 as part of one of the second end turn supports 44 with understanding that others of the second end turn supports 44 and the first end turn supports 42 may include similar structure, in accordance with a non-limiting example. End turn support 44 includes a first wall 66 that extends substantially from end turn support portion 62 radially outwardly relative to shaft 29, a second wall 70 that extends axially outwardly from first wall 66 spaced from shaft 29, and a third wall 72 that extends axially outwardly of first wall 66 along shaft 29. First wall 66, second wall 70, and third wall 72 collectively form a channel 74 having a generally U-shape that is receptive of one of the first end turns 54.

Referring to FIG. 6, in a non-limiting example, shaft 29 includes an outer surface 81 and an inner surface 82. Outer surface 81 supports rotor laminations 26 and inner surface 82 defines a passage 83. An opening 84 extends from passage 83 through outer surface 81. A coolant passage 86 is defined between rotor laminations 26 and outer surface 81. Coolant passage 86 may be formed as scallops on an inner diameter (not separately labeled) of rotor laminations 26. It should be understood that multiple scallops (and therefore coolant passages 86) may be spaced circumferentially around annular inner surface 31 of rotor laminations 26. Coolant passage 86 may direct coolant in opposite axial directions towards the first end turn support 44 and the second end turn support 42. Opening 84 fluidically connects passage 83 and coolant passage 86. Coolant, such as oil, may pass into passage 83, flow through opening 84 and towards first end 35 and second end 37 through coolant passage 86. The coolant may exchange heat with rotor laminations 26.

In accordance with a non-limiting example, a damping member (not separately labeled) is arranged between first end turn support 44 and rotor laminations 26. Another damping member (not shown) may be arranged between second end turn support 46 and rotor laminations 26. The damping member may be formed from, for example, a plastic material. A plurality of bolts (also not separately labeled) extends through rotor laminations 26 and the damping member. The damping member(s) generally isolate rotor laminations 26 from vibrations and other forces, help insulate rotor windings 36.

Figure 7:
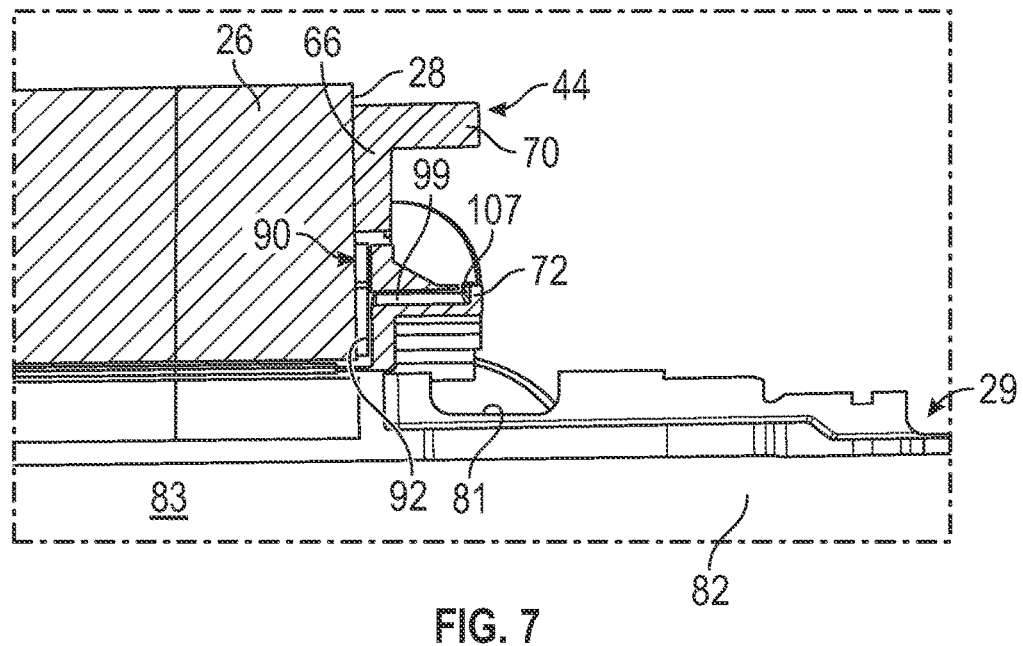
FIG. 7 depicts a cross-section of the rotor of FIG. 5 taken along the line 7-7, in accordance with a non-limiting example.
Figure 8:
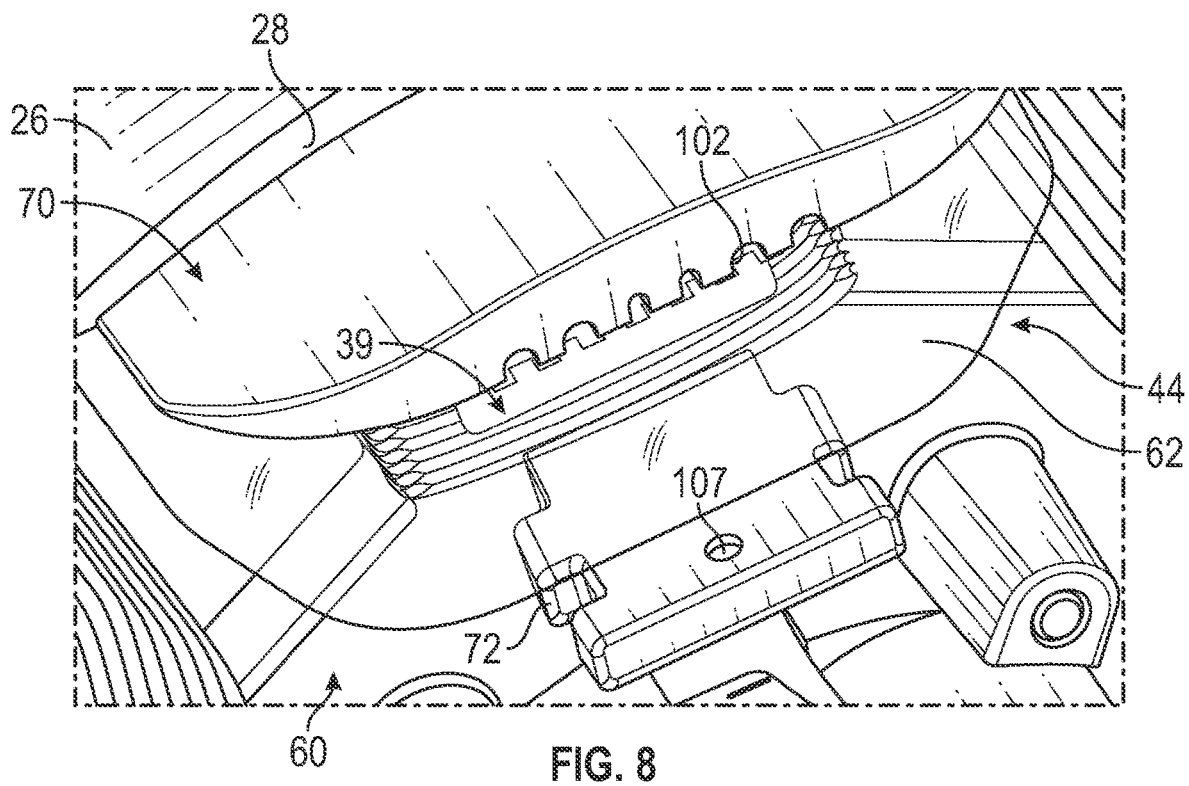
FIG. 8 depicts a top view of the end turn support of FIG. 5, in accordance with a non-limiting example.

In a non-limiting example, cooling system 39 includes a cooling circuit 90 integrated into each first end turn support 42. Cooling circuit 90 includes a first circuit portion 92 that extends between rotor laminations 26 and first wall 66. First circuit portion 92 includes a first outlet 94 shown in the form of a slotted opening 95 (FIG. 5) that is exposed to channel 78. Cooling circuit 90 also includes a second circuit portion 97 and a third circuit portion 99 (FIG. 7). Second circuit portion 97 terminates at a plurality of open channels 102 formed in second wall 70 that face axially outwardly and radially inwardly and third circuit portion 99 includes a second outlet 107 that faces radially outwardly.

In a non-limiting example, first outlet 94 directs coolant into second circuit portion 97. The coolant flows along an axially interior surface 110 of second end turns 56 before passing into second circuit portion 97 and third circuit portion 99. End turn support 44 may include grooves 100 (FIG. 5) which fluidly connect first outlet 94 and the channels 102. Grooves 100 are fluidly connected to the first outlet 94. Grooves 100 extend radially from the first outlet 94. Grooves 100 are fluidly connected to channels 102 which extend axially and are located in second wall 70. The coolant in second circuit portion 97 passes outwardly from channels 102 onto an outer surface 111 of first end turns 54. The coolant in third circuit portion 99 passes through a second outlet 107 and is directed outwardly onto an inner surface 112 of first end turns 54.

Figure 9:
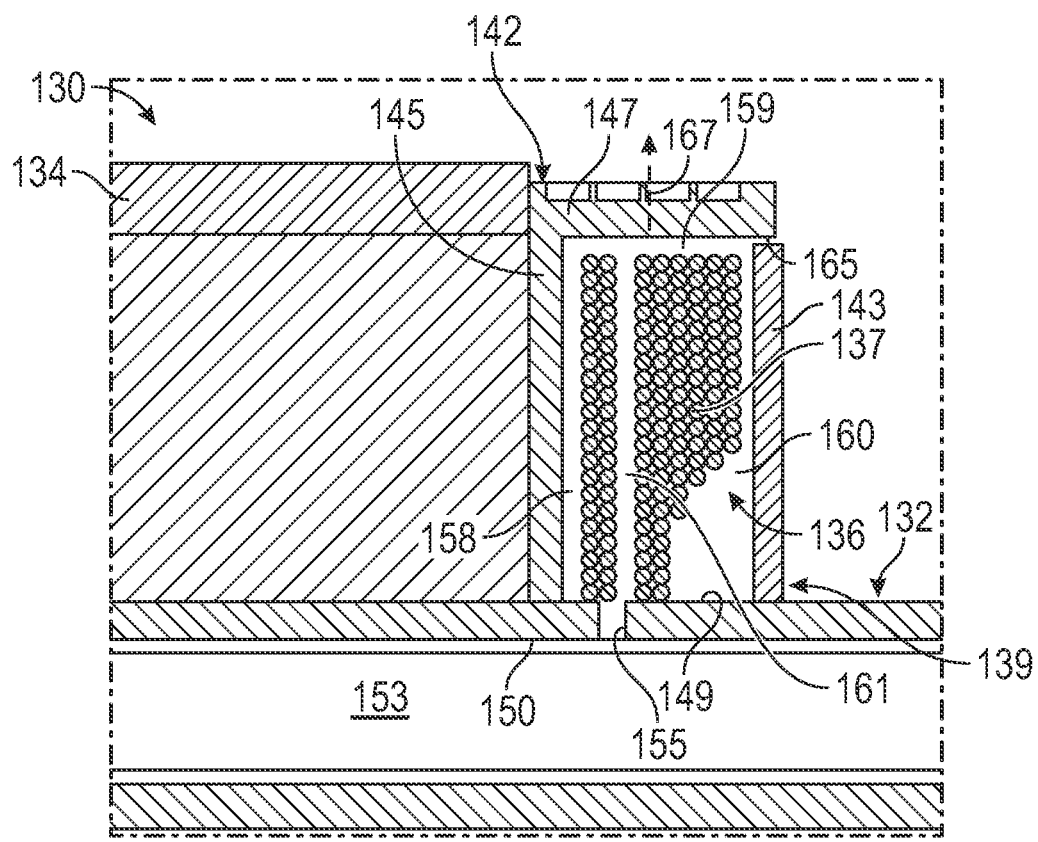
FIG. 9 depicts a rotor having a cooling system, in accordance with another non-limiting example.

Reference will now follow to FIG. 9 in describing a rotor 130 in accordance with another non-limiting example. Rotor 130 includes a shaft 132 that supports a plurality of rotor laminations 134 and a plurality of rotor windings 136 including an end turn 137. Rotor 130 includes a cooling system 139 that directs coolant onto windings 136 and end turn 137. In a non-limiting example, cooling system 139 includes an end turn support 142. An end cover 143 is provided over end turn 138 and end turn support 142. End turn support 142 includes a first wall 145 that extends radially outwardly relative to shaft 132 along rotor laminations 134 and a second wall 147 that extends axially outwardly of first wall 145 over end turns 138.

In a non-limiting example, shaft 132 includes an outer surface 149 that supports rotor laminations 134 and an inner surface 150 that defines a passage 153. An opening 155 extends through shaft 132 connecting passage 153 with end turn support 142. As will be discussed herein, opening 155 allows coolant to flow directly from passage 153 into end turn 137. In a non-limiting example, cooling system 139 includes a first cooling circuit 158, a second cooling circuit 159, a third cooling circuit 160, and a fourth cooling circuit 161 disposed on end turn support 142. It should be understood that each end turn of rotor 130 includes an end turn support that may support a similar cooling system.

In a non-limiting example, first cooling circuit 158 extends radially outwardly from shaft 132 between first wall 145 and end turn 137. Second cooling circuit 159 extends between second wall 147 and end turn 137, third cooling circuit 160 extends between end cover 143 and end turn 137, and fourth cooling circuit 161 extends directly through end turn 137 and connects with second cooling circuit 159. End turn 137 includes a spacer 163 which creates a void the defines fourth cooling circuit 161. Second cooling circuit 159 includes a first outlet 165 that directs cooling axially outwardly of second wall 147 and radially outwardly of rotor 130, and a second outlet 167 that extends through second wall 147. Second outlet 167 directs coolant directly radially outwardly of rotor 124.

At this point, it should be understood that the non-limiting examples describe variations of a cooling system that directs coolant onto various surfaces of an end turn and then subsequently radially outwardly onto a stator in order to promote cooling. The use of end turn supports adds additional flexibility to the creation of cooling circuits that guide coolant onto specific areas of a rotor end turn. The incorporation of an end cap provides structure that allows the coolant, after passing over the end turns, to be flung radially outwardly onto stator end turns to make further use of heat absorbing capacity of the coolant.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotor for an electric machine comprising:
    a shaft having a first end, a second end, an outer surface and an inner surface that defines a passage extending between the first end and the second end;
    a plurality of rotor laminations mounted to the outer surface of the shaft;
    a plurality of windings extending about the plurality of rotor laminations, the plurality of windings including a first end turn at the first end and a second end turn arranged at the second end; and
    an end turn support arranged at one of the first and second end turns, a portion of the end turn support being located between the plurality of rotor laminations and the end turn, the end turn support including a cooling circuit fluidically connected to the passage, the cooling circuit including an outlet that directs coolant into a groove in the end turn support, the groove extending radially from the outlet, the coolant being directed onto the one of the first and second end turns.

2. The rotor according to claim 1, further comprising: a coolant passage disposed between the plurality of rotor laminations and the shaft, the coolant passage guiding coolant axially from the passage to the end turn support.

3. The rotor according to claim 1, wherein the first end turn includes a first interior surface and the second end turn includes a second interior surface the outlet directing coolant to flow along one of the first and second interior surfaces.

4. The rotor according to claim 1, wherein the outlet directs coolant radially outwardly onto the one of the first and second end turns.

5. The rotor according to claim 4, wherein the end turn support further including a channel in an outer wall of the end turn support, the channel extending axially of the rotor, the channel being fluidically connected to the grooves.

6. The rotor according to claim 1, wherein the cooling circuit includes a first portion that directs coolant onto an outer surface of the at least one of the first and second end turns.

7. The rotor according to claim 6, wherein the coolant circuit includes a second portion that directs coolant over a second surface of the one of the first and second end turns, the second portion including a plurality of channels.

8. The rotor according to claim 6, wherein the cooling circuit includes a second portion that directs coolant radially outwardly onto an inner surface of the at least one of the first and second end turns.

9. The rotor according to claim 1, further comprising: a rotor end cap disposed over the one of the first and second end turns, wherein the end cap includes a plurality of outlets that direct coolant radially outwardly toward a stator.

10. The rotor according to claim 1, wherein the end turn support includes a first wall extending along one of the plurality of laminations and a second wall extending from the first wall spaced from the shaft, the one of the first and second end turns being arranged between the shaft and the second wall.

11. The rotor according to claim 10, wherein the shaft includes an opening arranged axially outwardly of the first wall and radially inwardly of the one of the first and second end turns, the cooling circuit being fluidically connected with the passage through the opening.

12. The rotor according to claim 11, wherein the cooling circuit includes a first passage extending between the first wall and the one of the first and second end turns, a second passage extending between the second wall and the one of the first and second end turns, and a third passage extending directly through the one of the first and second end turns.

13. The rotor according to claim 12, further comprising: a spacer mounted in the one of the first and second end turns, the spaces forming the second passage.

14. An electric machine comprising:
    a housing;
    a stator fixedly supported in the housing; and
    a rotor comprising:
        a shaft having a first end, a second end, an outer surface and an inner surface that defines a passage extending between the first end and the second end;
        a plurality of rotor laminations mounted to the outer surface of the shaft;
        a plurality of windings extending about the plurality of rotor laminations, the plurality of windings including a first end turn arranged at the first end and a second end turn arranged at the second end; and
        an end turn support arranged at one of the first and second end turns, a portion of the end turn support being located between the plurality of rotor laminations and the end turn, the end turn support including a cooling circuit fluidically connected to the passage, the cooling circuit including an outlet that directs coolant into a groove in the end turn support, the groove extending radially from the outlet, the coolant being directed onto the one of the first and second end turns.

15. The rotor according to claim 14, further comprising: a coolant passage disposed between the plurality of rotor laminations and the shaft, the coolant passage guiding coolant axially from the passage to the end turn support.

16. The rotor according to claim 14, wherein the first end turn includes a first interior surface and the second end turn includes a second interior surface the outlet directing coolant to flow along one of the first and second interior surfaces.

17. The rotor according to claim 14, wherein the outlet directs coolant radially outwardly onto the one of the first and second end turns.

18. The rotor according to claim 17, wherein the end turn support further including a channel in an outer wall of the end turn support, the channel extending axially of the rotor, the channel being fluidically connected to the grooves.

19. The rotor according to claim 14 wherein the cooling circuit includes a first portion that directs coolant onto an outer surface of the at least one of the first and second end turns.

20. The rotor according to claim 19, wherein the coolant circuit includes a second portion that directs coolant over a second surface of the one of the first and second end turns, the second portion including a plurality of channels.

21. The rotor according to claim 19, wherein the cooling circuit includes a second portion that directs coolant radially outwardly onto an inner surface of the at least one of the first and second end turns.

22. The rotor according to claim 14, further comprising: a rotor end cap disposed over the one of the first and second end turns, wherein the end cap includes a plurality of outlets that direct coolant radially outwardly toward a stator.

23. The rotor according to claim 14, wherein the end turn support includes a first wall extending along one of the plurality of laminations and a second wall extending from the first wall spaced from the shaft, the one of the first and second end turns being arranged between the shaft and the second wall.

24. The rotor according to claim 23, wherein the shaft includes an opening arranged axially outwardly of the first wall and radially inwardly of the one of the first and second end turns, the cooling circuit being fluidically connected with the passage through the opening.

25. The rotor according to claim 24, wherein the cooling circuit includes a first passage extending between the first wall and the one of the first and second end turns, a second passage extending between the second wall and the one of the first and second end turns, and a third passage extending directly through the one of the first and second end turns.

26. The rotor according to claim 25, further comprising: a spacer mounted in the one of the first and second end turns, the spaces forming the second passage.

27. A rotor for an electric machine comprising:
a shaft having a first end, a second end, an outer surface and an inner surface that defines a passage extending between the first end and the second end;
a plurality of rotor laminations mounted to the outer surface of the shaft;
a plurality of windings extending about the plurality of rotor laminations, the plurality of windings including a first end turn arranged proximate the first end and a second end turn arranged proximate the second end turn; and
an end turn support arranged at one of the first and second end turns, the end turn support including a cooling circuit fluidically connected to the passage, the cooling circuit including an outlet that directs coolant onto the one of the first and second end turns, wherein the cooling circuit includes a first portion that directs coolant onto an outer surface of the at least one of the first and second end turns and a second portion that directs coolant over a second surface of the one of the first and second end turns, the second portion including a plurality of channels.

* * * * *